Jan. 17, 1939.　　　　A. F. BEAN　　　　2,144,560
CLEANING GUN FOR VISCOSE PUMPS
Filed Oct. 27, 1937
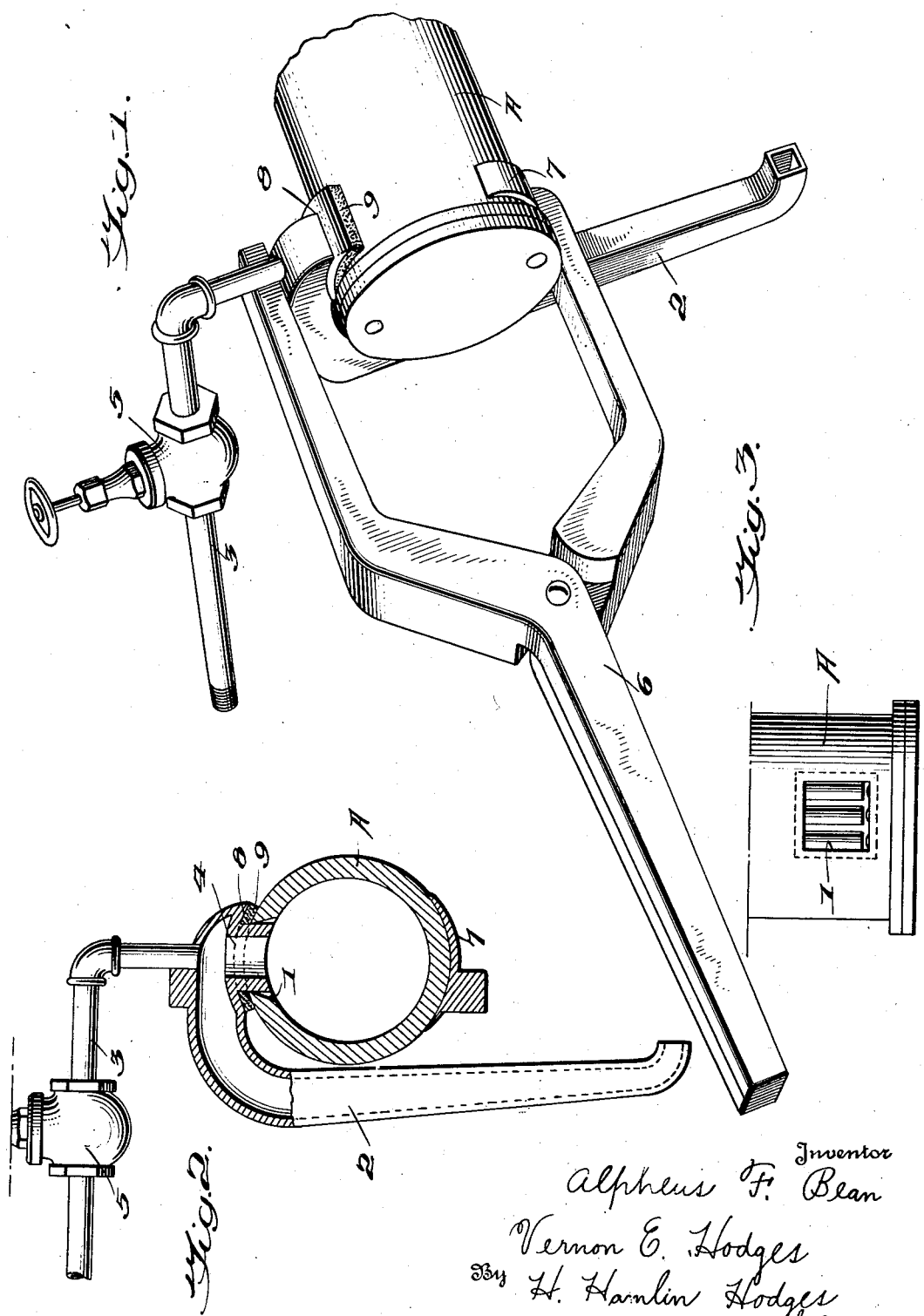
Inventor
Alpheus F. Bean
Vernon E. Hodges
By H. Hamlin Hodges
his Attorneys Patented Jan. 17, 1939

2,144,560

UNITED STATES PATENT OFFICE 2,144,560

CLEANING GUN FOR VISCOSE PUMPS

Alpheus F. Bean, Roanoke, Va.

Application October 27, 1937, Serial No. 171,295

5 Claims. (Cl. 15—155)

My invention relates to an improvement in cleaning guns for viscose pumps.

In the present practice of cleaning these pumps, one of the problems is the disposition of the viscose material when forced out of the pump.

The object of my invention is to take care of this problem in a very simple and practical way, and the invention consists in means for clamping the discharge nozzle of an air, water or steam line over the one inch square opening in the barrel of the new style standard viscose pump, and providing an outlet which will discharge the cleaned out contents of the pump at a predetermined point where it will be out of the way and easily disposable.

In the accompanying drawing:

Fig. 1 is a view in perspective;

Fig. 2 is a cross-section;

Fig. 3 is a fragmentary detail to show form of opening in present standard viscose pump.

A, represents a standard pump barrel. This has an opening 1, at the top, which is one inch square, and increases in size inwardly for convenience in inserting a stick or other similar means for cleaning the thicker portions collecting on the walls of the barrel. The numeral 2 is a spout which is of such shape and length as to dispose of the contents cleaned out of the barrel at some convenient point.

A one-quarter inch (¼") pipe line 3 leads to the upper end of this spout 2, preferably to a point directly over the outlet 4 into the barrel, and the one-fourth inch (¼") pipe line is controlled by a valve 5.

Tongs 6 are connected with the end of the spout which receives the material from the pump. The lower jaw of the tongs is provided with a seat 7 curved to embrace the barrel and the receiving end 8 of the nozzle 2 is curved in similar fashion to correspond with the curvature of the pump barrel. A gasket 9 may be placed between this receiving end 8 and the barrel A to form a tight joint when the tongs are gripped tightly in the operator's hand, or a ground seat would serve the purpose.

In the application and use of this invention, the tongs are applied to the barrel as illustrated in Fig. 1 and grip tightly to clamp the curved seats 7 and 8 around the barrel of the pump with the discharge outlet 4 opposite the one inch (1") square opening 1 in the barrel, and the valve 5 is in position to be operated and controlled by the operator to regulate the discharge therefrom.

It is understood that water or steam, such for example as dry steam, if desirable, may be employed instead of air.

The cleaner is easily and quickly applied or removed, and the material cleaned out of the pump is disposed of at some convenient point through the nozzle 2.

The cleaning mechanism is easily and quickly removed by opening the tongs at the end of the cleaning operation and removing the device from the pump barrel.

In the use and operation of my improved cleaning gun for viscose pump, keep the plungers open as this will keep the viscose material and oil mixed as they revolve, and it keeps the viscose soft. The soft viscose should not be run out every time the pump is oiled, but the viscose and oil should be mixed together and intermingled until of light tan color since the soft viscose has to mix with the oil in order to soften the hard viscose, and the viscose should be soft in order to facilitate the cleaning of the pump properly by the air or other fluid employed.

I claim:

1. A cleaning gun for pumps and the like which consists in tongs having curved seats for gripping the pump barrel, an inlet pipe, and a discharge nozzle, the inlet pipe and discharge nozzle connected with one of the jaws.

2. A cleaning gun for pumps and the like, which consists in tongs having means for gripping the pump barrel, an inlet pipe, and a discharge nozzle, said discharge nozzle forming an integral and permanent part of one of the jaws of the tongs.

3. The combination of a pump barrel having an opening therein, of tongs having curved seats for embracing the barrel around the opening, an inlet pipe for discharging the cleaning medium into the barrel, a discharge nozzle, said inlet pipe and discharge nozzle connected with one of the jaws of the tongs.

4. A cleaning gun including pivotally connected tongs, one jaw of which is provided with a seat fashioned to fit a curved surface, and the other jaw having a discharge spout, the receiving end of this spout also fashioned to fit the outer surface of the object to be cleaned, means adapted to be placed between this receiving end and the object embraced to form a tight joint when the tongs are gripped tightly in the operator's hand, a pipe line leading to the upper end of the spout, and a valve for controlling the discharge from the pipe line.

5. A cleaning gun for viscose pumps, which includes two pivoted jaws, one of which jaws has an inlet pipe and a discharge nozzle, and is provided with an opening adapted to communicate with a hole in a pump barrel, and a valve to control the discharge from the inlet pipe through the hole in the barrel, and for forcing the material cleaned out of the barrrel therefrom and out through the discharge nozzle.

ALPHEUS F. BEAN.